(12) United States Patent
Barnett (10) Patent No.: US 7,010,834 B2
(45) Date of Patent: Mar. 14, 2006

(54) HINGE ASSEMBLY, AND ASSOCIATED METHOD, PROVIDING MULTIPLE AXES OF ROTATION

(75) Inventor: Ricky William Barnett, Radlett (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/238,339

(22) Filed: Sep. 10, 2002

(65) Prior Publication Data

US 2004/0045131 A1    Mar. 11, 2004

(51) Int. Cl.
  *E05D 3/10*    (2006.01)
(52) U.S. Cl. .................................................. 16/367
(58) Field of Classification Search ............... 16/367, 16/366, 368, 369, 370; 403/57, 58, 59, 60; 361/802, 803, 680–682, 683; 248/122.1, 248/125.9, 917–923; 379/433.11–13, 434, 379/433, 428
See application file for complete search history.

(56) References Cited

U.S. PATENT DOCUMENTS

| | | | |
|---|---|---|---|
| 4,043,000 A * | 8/1977 | Bunker | 16/384 |
| 4,529,154 A * | 7/1985 | Rinn et al. | 244/158 R |
| 4,654,671 A * | 3/1987 | Baghdasarian | 343/915 |
| 4,658,472 A * | 4/1987 | Grenier | 16/225 |
| 4,692,964 A * | 9/1987 | DeBruyn | 16/367 |
| 4,750,828 A * | 6/1988 | Sartor | 351/115 |
| 5,206,790 A * | 4/1993 | Thomas et al. | 361/681 |
| 5,335,142 A * | 8/1994 | Anderson | 361/681 |
| 5,596,789 A * | 1/1997 | Simioni | 16/228 |
| 5,708,560 A * | 1/1998 | Kumar et al. | 361/680 |
| 5,995,373 A * | 11/1999 | Nagai | 361/755 |
| 6,195,839 B1 * | 3/2001 | Patterson et al. | 16/334 |
| 6,275,376 B1 * | 8/2001 | Moon | 361/683 |
| 6,447,043 B1 * | 9/2002 | VandenHeuvel et al. | 296/76 |
| 6,594,860 B1 * | 7/2003 | Czipri | 16/367 |
| 2002/0109962 A1 * | 8/2002 | Tseng et al. | 361/681 |
| 2003/0167601 A1 * | 9/2003 | Chen | 16/367 |

* cited by examiner

*Primary Examiner*—Robert J. Sandy
*Assistant Examiner*—Andre L. Jackson
(74) *Attorney, Agent, or Firm*—Alston & Bird LLP (57) ABSTRACT

A hinge assembly, and an associated method, for hingedly connecting separate body portions, such as first and second housing portions of a mobile station, theretogether. The hinge assembly provides multiple axes of rotation including, at least, a transversely-extending axes and a longitudinally-extending axis. The hinge assembly includes a first hinge piece and a second hinge piece, associated, respectively, with the first and second body portions. The hinge pieces are coupled theretogether by a bearing that permits rotational movement about a longitudinally-extending axis. And, at least one of the hinge pieces is hingedly-connected to a body portion with which the hinge piece is associated to permit rotational movement about a transversely-extending axis.

8 Claims, 5 Drawing Sheets

HINGE ASSEMBLY, AND ASSOCIATED METHOD, PROVIDING MULTIPLE AXES OF ROTATION

The present invention relates generally to a hinge assembly for hingedly-connecting elements, such as separate portions of a portable mobile station, or other electronic device, theretogether. More particularly, the present invention relates to an assembly, and an associated method, by which hingedly to connect the separate portions theretogether while selectably permitting relative rotation of the separate portions about a first axis of rotation and about at least a second axis of rotation.

The multiple-axes of rotation permit relative rotation of the separate portions, thereby selectably to provide twisting, flipping, and sidewinding movements. And, a conduit passageway is provided by which to permit conductive wiring, or cabling, to interconnect electrical circuits embodied at the separate portions. Electrical interconnection between the electrical circuits is maintained irrespective of the relative positioning of the separate portions as well as during the rotation of the separate portions about any of the multiple axes.

BACKGROUND OF THE INVENTION

The use of consumer electronic devices is pervasive in modern society. Such consumer electronic devices are of many varied constructions, operable to perform many varied functions.

Consumer electronic devices that provide for the effectuation of communication services are exemplary of consumer electronic devices that are widely utilized. Such devices are sometimes referred to as communication stations. The pervasiveness of use of such devices to effectuate communication services has made such devices, at times, seem to be a necessary adjunct of modern society. Such a device communicates, generally, by way of a network infrastructure that, together with the consumer electronic device, defines a communication system.

Network infrastructures of various public-access communication systems have been installed to encompass many populated areas of the world. Paging systems, trunked-radio systems, and cellular communication systems are all exemplary of communication systems of whose networks have been installed to encompass significant populated areas of the world and that have achieved significant levels of usage. Communication by way of any of such communication systems is generally effectuated pursuant to a service subscription. A user subscribes to use of a communication system pursuant to the terms of the subscription. And, the user, utilizing a communication station operable in the appropriate communication system, communicates by way of the communication system to send, or to receive, or both, data thereby to effectuate the communication service.

Many communication stations operable by users are constructed to be of dimensions to permit their hand-carriage by the user. In a cellular communication system, for instance, the communication station typically used by a user is referred to as a mobile station and is of dimensions, typically, to permit its hand-carriage by the user.

Advancements in circuit technologies have permitted the circuitry forming a mobile station, as well as other electronic devices, increasingly to be miniaturized. Efforts are ongoing to provide yet more miniaturization of the electronic circuitry of such electronic devices.

By miniaturizing the electronic circuitry of which an electronic device is formed, the physical dimensions of the housing in which such electronic circuitry is housed, can correspondingly be reduced. Other mechanical structure associated with the housing in which the electronic circuitry is housed correspondingly can also be of reduced dimensions.

Reduction in dimensions of the housing, in a particular direction, can be reduced by housing the electronic circuitry in housing portions that can be folded over, one portion upon another. And, certain ergonometric advantages are also provided to the electronic devices by housing the electronic circuitry thereof in separate housing portions.

For instance, a mobile station typically includes a telephonic keypad having a plurality of actuation keys, each permitting actuation thereof by a user. Actuation of a selected key, or keys, of the actuation keypad permits, for instance, a user to initiate a call that is to be originated at the mobile station. Actuation of an actuation key also accepts a call, originated elsewhere, that is terminated at the mobile station. Through appropriate placement of the actuation keys of the telephonic keypad, the housing portions can be caused to be folded over in a manner such that one housing portion covers the telephonic keypad when the mobile station is not to be in use. The housing portion that is folded-over upon the housing portion at which the telephonic keys are positioned provides a protective cover of the telephonic keypad, preventing the actuation keys from being inadvertently actuated.

Various constructions of mobile stations, as well as other consumer electronic devices, include visual displays for displaying data in visual form. For instance, a streaming video service, such as pursuant to effectuation of a multimedia communication service, is displayed upon a visual display. Positioning of the visual display at a housing portion of the mobile station, or other consumer electronic device, that permits movement relative to another housing portion of the device, facilitates user viewing of the visual display. A conventional, camcorder display device, for instance, is positioned at a housing portion separate from, but connected to, a housing portion that contains other circuitry of the camcorder. Rotational movement of the housing portion containing the display facilitates user viewing of the display during recording, playback, or other operation of the camcorder.

Various hinge, and other connector, assemblies have been developed and are regularly utilized in consumer electronic devices, as well as other devices, to permit the relative movement of the separate housing portions of the device. Such assemblies must be of dimensions appropriate for the devices at which such assemblies are used. That is to say, as the packages in which the devices are housed are increasingly miniaturized, the hinge, or other connector, assemblies, must correspondingly be of reduced dimensions. And, when separate electronic circuit portions are positioned in the separate housing portions, a manner must be provided by which electrically to interconnect the electronic circuitry portions housed at the separate housing portions.

Existing hinge assemblies, used to interconnect separate housing portions of a portable, consumer electronic device, such as a portable mobile station, generally provide for limited rotational movement about a single axis of rotation.

It would be advantageous to provide an assembly that permits selected movement of the separate housing portions of the device about more than one axis of rotation while still permitting separate electronic circuitry portions embodied at the separate housing portions to remain in electrical connection, irrespective of the relative positioning of the housing parts as well as during movement of the housing portions.

It is in light of this background information relating to hinge, and other connector, assemblies for electronic devices that the significant improvements of the present invention have evolved.

SUMMARY OF THE INVENTION

The present invention, accordingly, advantageously provides a hinge assembly, and an associated method, by which hingedly to connect separate portions of an electronic device theretogether while also selectably permitting relative rotation of the separate portions about a first axis of rotation and about at least a second axis of rotation.

Through operation of an embodiment of the present invention, a manner is provided by which hingedly to connect elements, such as separate portions of a portable mobile station, or other electronic device theretogether.

The hinged connection by which the separate portions are connected, by providing the multiple axes of rotation, permit twisting, flipping, and side winding movements of the separate portions.

A conduit passageway is provided by which to permit conductive wiring, or cabling, to interconnect the circuit devices positioned, or otherwise embodied, at the separate portions.

In one aspect of the present invention, the separate portions are hingedly connected to permit relative rotation about a first axis of rotation. The first axis of rotation is defined transversely across one of the separate portions. Selected rotational movement is permitted about such transversely-extending axis.

In another aspect of the present invention, the separate portions are hingedly connected to permit relative rotation about a second axis of rotation. The second axis of rotation is defined longitudinally through one of the separate portions. Selected rotation is permitted about such longitudinally-extending axis.

Through application of an actuation force to one, or another of the separate portions, rotation about the transversely-extending axis is effectuated. Folding movement of one, or the other, of the separate portions is effectuated through application of an appropriate actuation force to position the separate portions in a folded arrangement. And, correspondingly, through application of an actuation force to one, or the other, of the separate portions in a reverse direction permits repositioning of the separate portions out of the folded arrangement and into an unfolded arrangement.

Also, through other appropriate application of actuation forces to one, or the other, of the separate portions, selected rotation of the affected portion is effectuated about the longitudinal axis. Through such application of the actuation force, the effected portion is permitted twisting or sidewinding movement, depending upon the location of the rotational axis. When positioned to extend longitudinally through a face of the portion, twisting movement is effectuated. And, when the longitudinal axis is defined to extend through a peripheral location of the portion, sidewinding movement is provided.

In another aspect of the present invention, the separate portions are formed of housing portions of a housing that houses the electronic circuitry of a consumer electronic device. Separate circuitry portions are housed at the separate housing portions. A hinge assembly hingedly interconnects the separate housing portions theretogether. A conduit passageway is formed through the hinge assembly to permit placement therethrough of connective wiring that connects the separate circuit portions of the electronic device theretogether. Once the electrical connector is positioned to extend through the conduit passageway and is suitably connected to the electronic circuitry portions positioned at the separate housing portions, the electronic circuitry portions are maintained in electrical connection irrespective of the relative positioning of the housing portions, both when maintained in the static position as well as during rotational movement about one, or more, of the multiple axes of rotation.

In one implementation, a hinge assembly is provided for a mobile station, such as a mobile station operable pursuant to a 3G (third-generation) cellular communication system operating specification. Namely, the hinge assembly defines at least a first transversely-extending axis about which the separate body portions are selectably rotatable and a longitudinally-extending axis of rotation about which selected rotation is also selectably permitted. Folding, twisting, and sidewinding movements of the housing portions are all permitted. A hinge-assembly body includes a first hinge-assembly part associated with the first body portion of the mobile station and a second hinge-assembly part associated with the second body portion. The first hinge-assembly part, associated with the first housing body portion engages with the first body portion and defines a transversely-extending axes therethrough. Upon application of rotational forces applied to the first body portion, the first body portion is rotated about the transversely-extending axis. And, through application of a rotational force to the second housing portion, rotation of the second housing portion is also effectuated about the transversely-extending axis. Flip-movement to position the mobile station in a folded configuration, or alternately, in an open, or unfolded configuration is effectuated through causing such rotation about the transversely-extending axis. The hinge-assembly parts further define faces that abut against one another and that are rotatably connected theretogether by way of a bearing permit rotational movement about a longitudinally-extending axis defined to extend longitudinally through the parts of the hinge assembly.

The housing-assembly parts are advantageously, for instance, formed of a thermoplastic material, manufacturable by an injection molding process. Manufacturing costs associated with manufacture of the hinge assembly are, accordingly, minimal.

In these and other aspects, therefore, a hinge assembly, and an associated method, is provided for a multi-part body formed of a first body portion and at least a second body portion. The first body portion is hingedly connected to the second body portion, selectably to permit relative rotation of the first and second body portions in a first manner and selectably in at least a second manner. A first hinge piece is at least selectably affixed to the first body portion. The first hinge piece defines a first transversely-extending axis and defines a longitudinally-extending axis. The first hinge piece has a first transverse seating surface and a first annular hinge surface formed annularly about the longitudinally-extending axis. A second hinge piece is at least selectably affixed to the second body portion. The second hinge piece has a second annular hinge surface formed annularly about the longitudinally-extending axis. And, the second annular hinge surface is coaxially positioned with the first annular hinge surface of the first hinge piece. Rotation of at least a selected one of the first and second body portions, respectively, is selectably permitted about the longitudinally-extending axis in the first manner, and rotation of at least a selected one of the first and second body portions, respectively, is selectably permitted about the first transversely-extending axis in the second manner.

A more complete description of the present invention and the scope thereof can be obtained from the accompanying drawings that are briefly summarized below, the following detailed description of the presently-preferred embodiments of the invention, and the appended claims.

DETAILED DESCRIPTION

Figure 1:
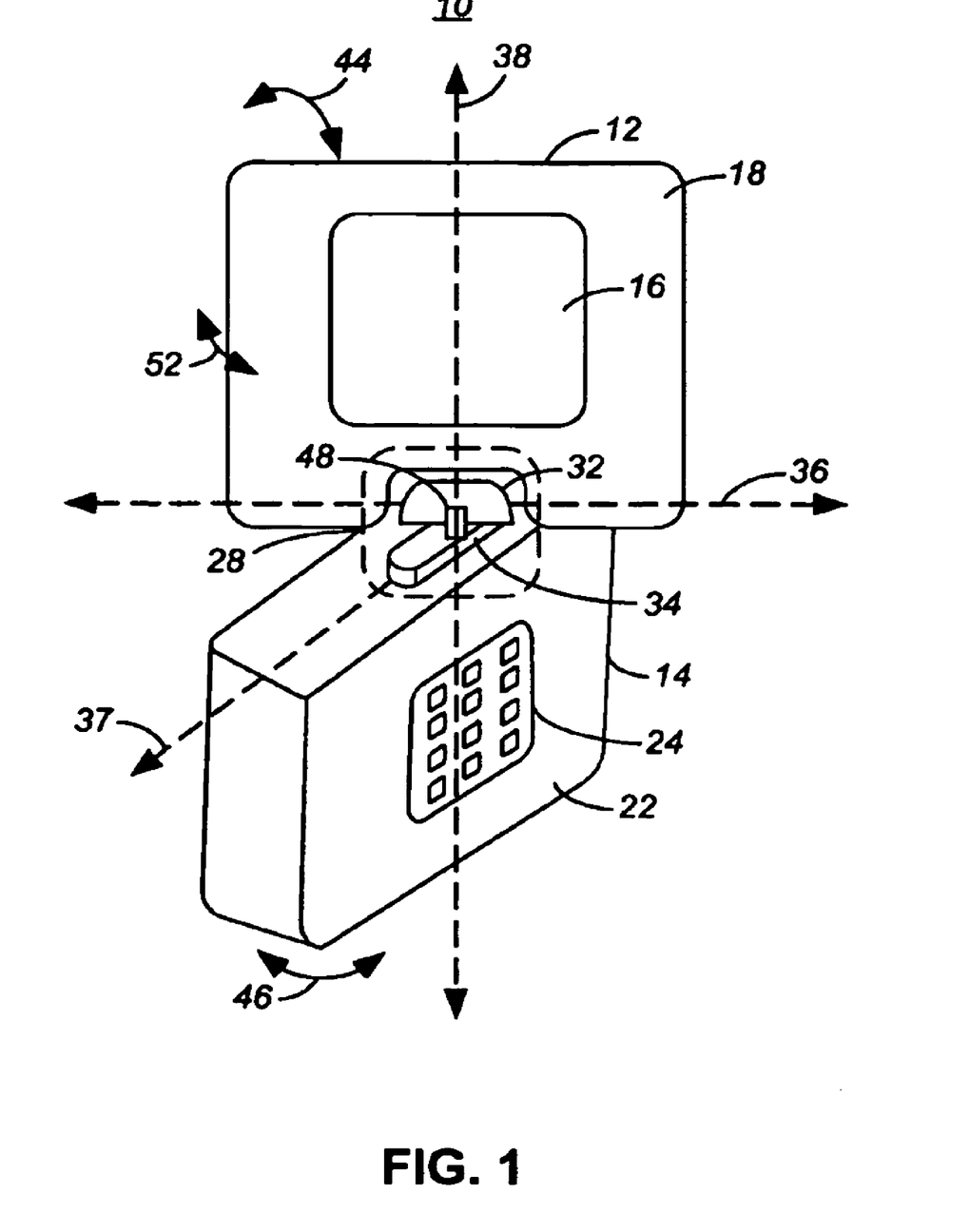
FIG. 1 illustrates a partial perspective, partial functional block diagram of a mobile station that includes the hinge assembly of an embodiment of the present invention.

Referring first to FIG. 1, a consumer electronic device, here a mobile station 10, is formed of a first body portion 12 and at least a second body portion 14. The body portions 12 and 14 are each formed of housing portions that house electronic circuitry of the mobile station. Here, the first body portion houses a user display element 16. A display face of the user display is positioned at the face surface 18 thereof. The display element 16 forms, for instance, a liquid crystal display that, together with supporting circuitry, permits display thereat, of a streaming video. The electronic circuitry positioned at the second body portion 14 also includes a portion disposed at a face surface, here the face surface 22, of the second body portion. The electronic circuitry positioned at the second body portion here forms a telephonic keypad 24 having conventional actuation keys, actuable by a user. Other user interfaces, such as an additional user display is alternately positioned at the second body portion in other implementations.

The body portions 12 and 14 are connected theretogether by way of a hinge assembly 28 of an embodiment of the present invention.

The hinge assembly 28 includes a first portion 32 and a second portion 34. The first portion forms a first hinge piece, and the second portion forms a second hinge piece. The first hinge piece is associated with the first body portion 12 and defines a first transversely-extending axis 36, extending transversely through the first hinge piece. The second hinge piece 34 is associated with the second body portion and defines a second-transversely-extending axis 37, extending transversely through the second hinge piece.

A longitudinally-extending axis 38 extends longitudinally through both the first hinge piece and the second hinge piece. In the exemplary implementation shown in the figure, the hinge assembly is centrally-positioned such that the longitudinally-extending axis 38 is defined to extend centrally through the first and second body portions. In other implementations, the hinge assembly is positioned elsewhere, i.e., closer to a side-edge surface of one, or both, of the body portions 12 and 14 to cause the longitudinally-extending axis defined by the hinge assembly to extend through other portions of the body portions.

One, or both, of the hinge pieces are connected to an associated one of the first and second body portions in a manner to permit rotational pivoting of the associated body portion about a corresponding, transversely-extending axis 36 or 37. For instance, when the first hinge piece formed of the first portion 32 is rotatably coupled to the first body portion 12, application of an actuation force in one of the directions indicated by the arrow at 44 causes pivotal movement of the first body portion in the associated direction about the first transversely-extending axis. Analogously, when the second hinge piece formed of the second portion 34 is connected to the second body portion in the manner to permit rotatable movement of the second body portion about the second transversely-extending axis 37, the second body portion is caused to rotate about the second transversely-extending axis. That is, when the second body portion is rotatably coupled to the second hinge piece, and an actuation force is applied to the second body portion in one of the directions indicated by the arrow 46, the second body portion is caused to rotate in the associated direction about the second transversely-extending axis.

And, when one of the hinge pieces 32 or 34 is in a fixed engagement with the associated body portion 12 or 14, application of an actuation force to the body portion associated with such hinge piece causes the body portion to be rotated about the other of the transversely-extending axes 36 or 37.

The first and second hinge pieces are connected by a bearing connection 48 in a manner that permits rotational movement of one, or both, of the body portions 12 and 14. Actuation forces applied to either of the body portions in one of the directions indicated by the arrows 52 cause pivotal movement of the body portion to which the actuation force is applied in the associated direction.

Because the hinge assembly 28 provides for selected rotational movement of one, or both, of the body portions 12 and 14 about both a transversely-extending axis as well as a longitudinally-extending axis, multiple-axis rotation is provided. Not only are flip motions of the respective body portions permitted, but, also, twisting and sidewinding motions are permitted.

Figure 2:
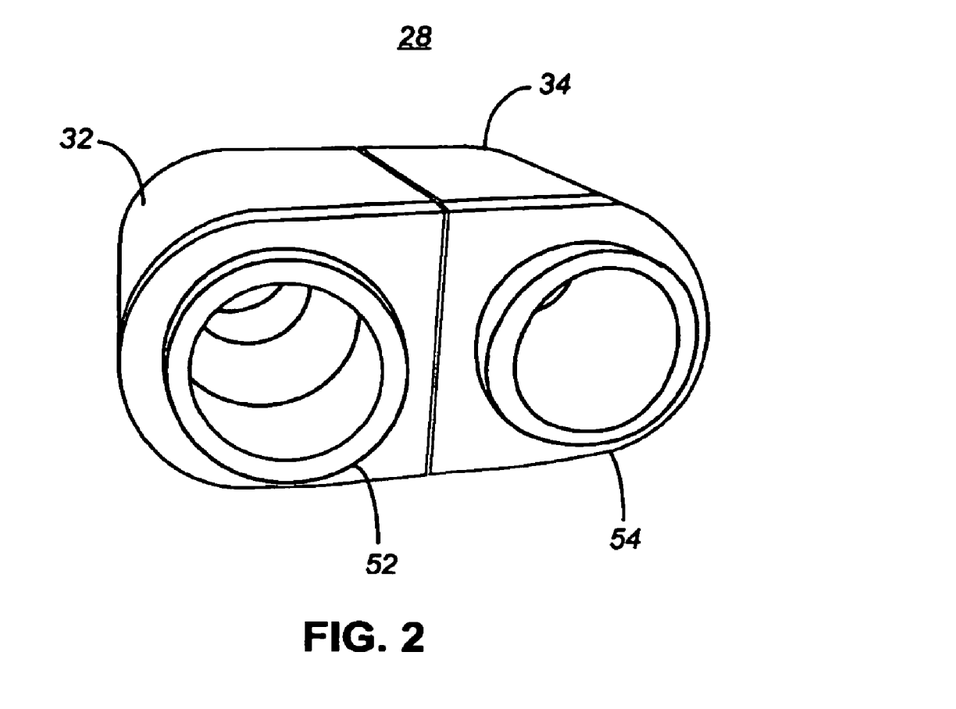
FIG. 2 illustrates a perspective view, in isolation, of the hinge assembly that forms a portion of the mobile station shown in FIG. 1.

FIG. 2 illustrates the hinge assembly, and the first and second hinge pieces formed of the first and second portions 32 and 34 thereof. Each of the hinge pieces, in the exemplary implementation, is of a thermoplastic material, formed by an injection molding process. Here, the hinge pieces are connected theretogether by way of the bearing 48 (shown in FIG. 1). The hinge pieces further define transversely-extending seating surfaces 52 and 54. The seating surfaces are annularly positioned about the transversely-extending axes defined by the respective ones of the hinge pieces. The seating surfaces provide for engagement with corresponding surfaces formed at the first and second body portions (shown in FIG. 1). Relative rotational movement is selectably permitted about the seating surfaces 52 and 54, thereby to permit the flipping or folding, movement of an associated body portion about the associated transversely-extending axis.

FIG. 3 again illustrates the hinge assembly 28, here in exploded form. Portions of the first and second body portions, here forming housing portions that house separate circuitry portions of the mobile station, or other consumer electronic device, shown in FIG. 1. Each of the hinge pieces is shown to include central body portions 58 and end pieces 62. And, the housing parts 64 forming the first and second body portions are shown to include seating surfaces 66 that seat together with the seating surfaces 52 and 54 of the first and second hinge pieces. The exploded view of the figure further illustrates annular rings 68 formed annularly about the longitudinally-extending axis formed longitudinally through the hinge assembly. Relative rotational movement about the longitudinal axis is provided therethrough.

Figure 3:
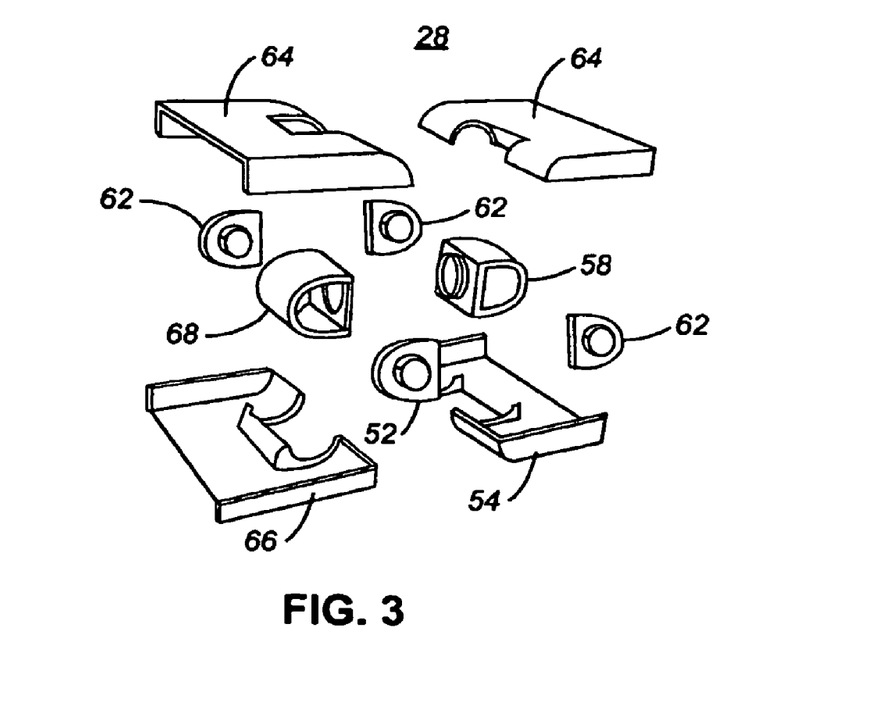
FIG. 3 illustrates a perspective, exploded view of the hinge assembly, shown in FIGS. 1 and 2, together with portions of the housing body of the mobile station shown in FIG. 1.

The hinge assembly is advantageously of a thermoplastic material, formed pursuant to an injection molding process. The hinge assembly pieces are hollow, thereby to define inner chambers. Electrical wiring is positioned to extend therethrough to interconnect the circuitry housed at the separate portions.

Figure 4:
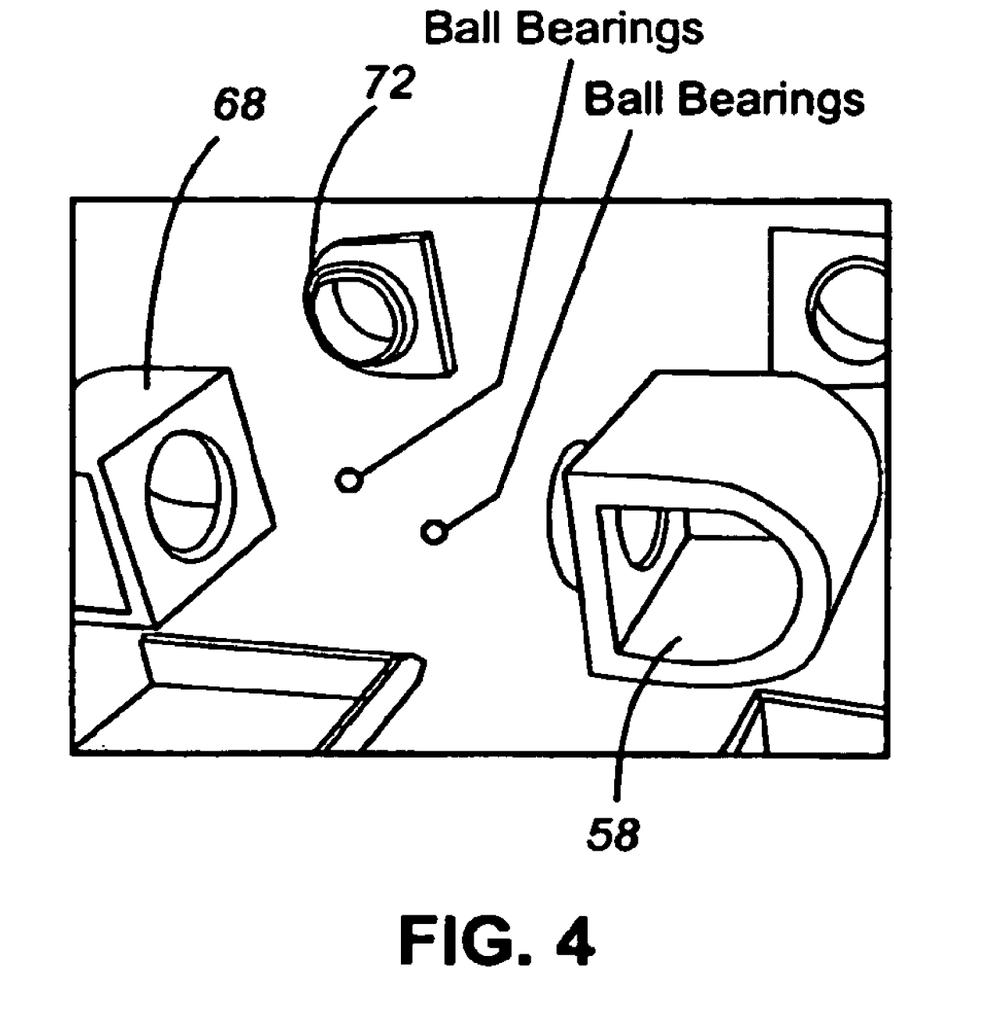
FIG. 4 illustrates another perspective, exploded view, of portions of the hinge assembly shown in the preceding figures.

FIG. 4 also illustrates portions of the hinge assembly 28. Here again, the annular rings 68 formed coaxially about the longitudinally-extending axis. The figure further illustrates ball bearings 72 that formed a bearing 48 through which the relative rotation of the body portions about the longitudinal access is provided.

FIGS. 5–8 illustrate various positions in which the first and second body portions 12 and 14 are positionable pursuant to rotation permitted by the hinge assembly 28.

Figure 5:
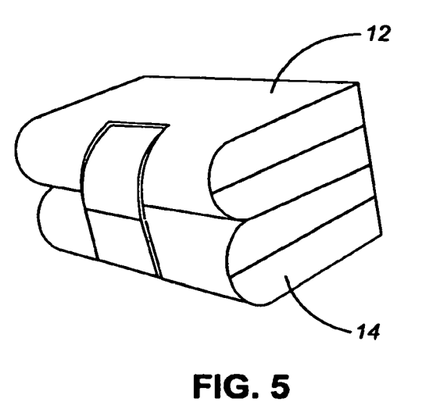
FIG. 5 illustrates positioning of separate portions of a mobile station body, or other structure, in a folded, or closed position pursuant to operation of the hinge assembly of an embodiment of the present invention.

The positioning of the body portions 12 and 14 in FIG. 5 illustrate a folded, or flipped, configuration in which the first body portion is rotated about the first transversely-extending axis 36, such that the face surfaces 18 and 22 (shown in FIG. 1) abut against one another.

Figure 6:
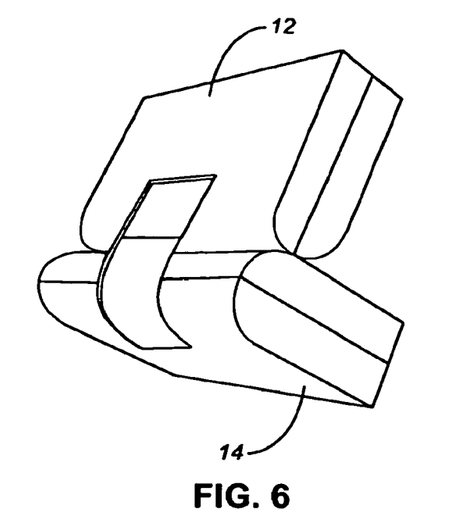
FIG. 6 illustrates a perspective view, similar to that shown in FIG. 5, but in which the device is rotated about a transversely-extending axis defined by the hinge assembly into a partially-open position.
Figure 7:
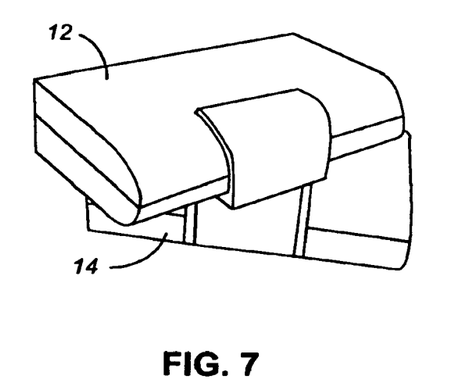
FIG. 7 illustrates swiveling movement of the device shown in FIGS. 5 and 6 about a longitudinally-extending axis of the hinge assembly of an embodiment of the present invention.
Figure 8:
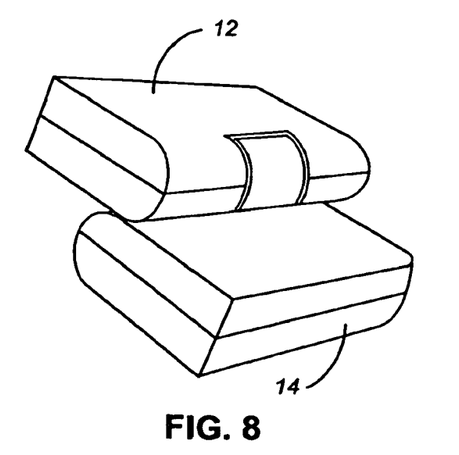
FIG. 8 illustrates a perspective view, similar to that shown in FIG. 7, but here in which additional rotation of the device about the longitudinally-extending axis of the hinge assembly.

The positioning of the first and second body portions 12 and 14 in FIG. 6 illustrate a configuration in which the first body portion 12 is rotated about the first transversely-extending axis so that both of the first and second face surfaces 18 and 22 (hidden from view in the figure) are available for viewing by a user of the mobile station. The positioning of the first and second body portions illustrate rotation of the first body portion about the longitudinally-extending axis, permitted by the bearing 48. And, the positioning of the first and second body portions shown in FIG. 8 represents the completion of the swiveling rotation about the longitudinally-extending axis.

Figure 9:
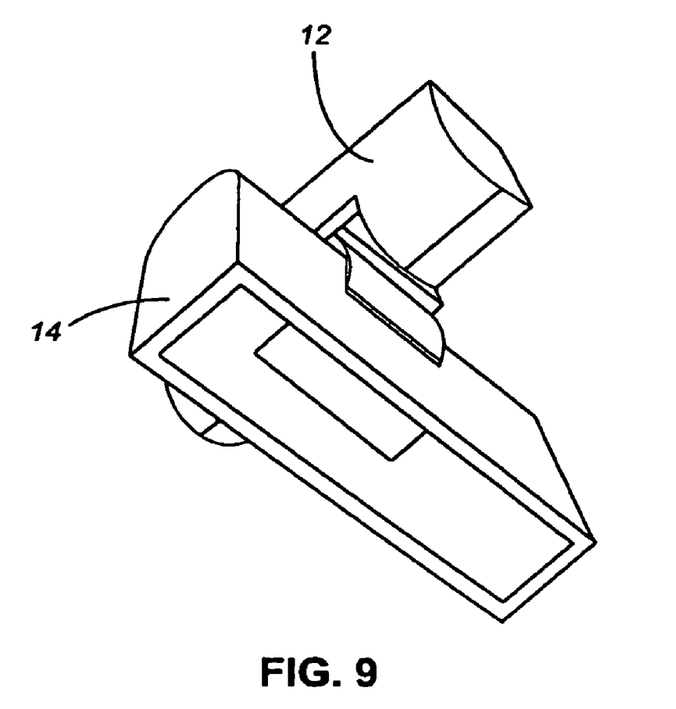
FIG. 9 illustrates another perspective view of rotation of the portions of a body hingedly connected by the hinge assembly of an embodiment of the present invention about a longitudinal axis defined by the hinge assembly.

FIG. 9 illustrates positioning of the first and second body portions, here in which swiveling movement of the second body portion 22 about the longitudinally-extending axis defined by the hinge assembly 28 positions the respective body portions at right angles to one another.

Figure 10:
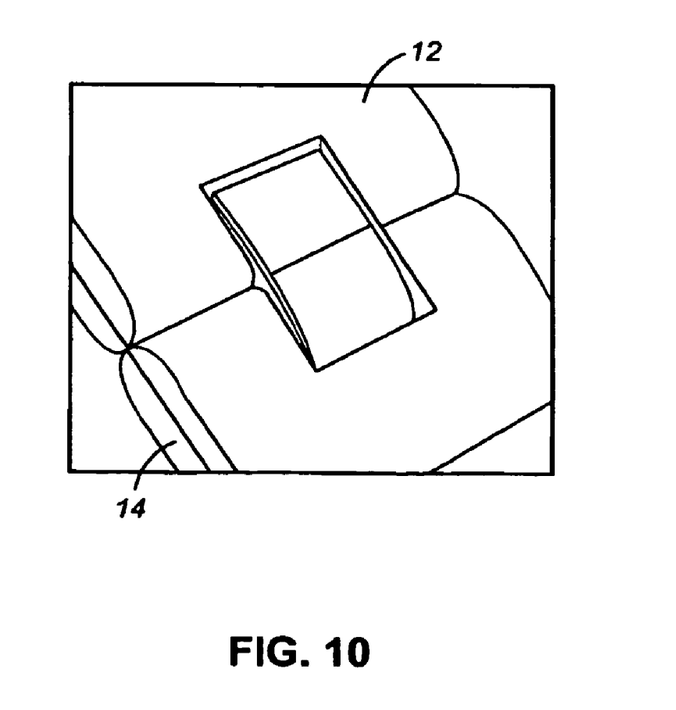
FIG. 10 illustrates another view of the hinge assembly positioned to interconnect separate portions of a body.

FIG. 10 illustrates the hinge assembly 28, again positioned to hingedly interconnect the first and second body portions. Here, surfaces of the first and second hinge pieces are presented for positioning of actuation keys that are connected to a fixing structure that maintains the body portions in respective positions relative to one another.

Because the first and second body portions include conduit passageways extending therethrough, electrical conduit, or other wiring, is positionable therethrough to interconnect electronic circuitry portions positioned at, or housed at, the first and second body portions. The electrical connection is maintained irrespective of the relative positions of the first and second body portions both during, and subsequent to, rotational movement about any of the transverse or longitudinal axes.

The previous descriptions are of preferred examples for implementing the invention, and the scope of the invention should not necessarily be limited by this description. The scope of the present invention is defined by the following claims:

I claim:

1. In a multi-part body formed of a first body portion and at least a second body portion, an improvement of a hinge assembly for hingedly connecting the first body portion together with the second body portion, said hinge assembly comprising:

a first hinge piece at least selectably affixed to the first body portion, said first hinge piece defining a first-transversely extending axis and defining a longitudinally-extending axis, said first hinge piece having a first annular hinge surface formed annularly about the longitudinally-extending axis; and a second hinge piece at least selectably affixed to the second body portion, said second hinge piece having a second annular hinge surface formed annularly about the longitudinally-extending axis and coaxially positioned with the first annular hinge surface of said first hinge piece; and a transverse seating surface of said first hinge piece comprising a first flanged, annular ring wherein the first body portion comprises a first spindle piece about which the flanged, annular ring is seated in selectable rotatable engagement therewith;

wherein said first hinge piece further comprises a second transverse seating surface formed of a second flanged, annular ring, positioned at a side of said first hinge piece opposed to a side of said first hinge piece at which the first flanged, annular ring, and wherein the first body portion further comprises a second spindle piece about which the flanged annular ring is seated; and wherein rotation of the first and second body portions with respect to each other is permitted about the longitudinally-extending axis in the first manner, and rotation of the first and second body portions with respect to each other is permitted about the first transversely-extending axis in the second manner.

2. In a multi-part body formed of a first body portion and at least a second body portion, an improvement of a hinge assembly for hingedly connecting the first body portion together with the second body portion, said hinge assembly comprising:

a first hinge piece at least selectably affixed to the first body portion, said first hinge piece defining a first-transversely extending axis and defining a longitudinally-extending axis, said first hinge piece having a first annular hinge surface formed annularly about the longitudinally-extending axis;

a transverse seating surface of said first hinge piece comprising a first flanged, annular ring wherein the first body portion comprises a first spindle piece about which the flanged, annular ring is seated in selectable rotatable engagement therewith; and a second hinge piece at least selectably affixed to the second body portion, said second hinge piece having a second annular hinge surface formed annularly about the longitudinally-extending axis and coaxially positioned with the first annular hinge surface of said first hinge piece;

wherein rotation of the first and second body portions with respect to each other is permitted about the longitudinally-extending axis in a first manner, and rotation of the first and second body portions with respect to each other is permitted about the first transversely-extending axis in a second manner; and wherein the first body portion comprises a first housing portion that houses a first electrical-circuit portion thereat, wherein the second body portion comprises a second housing portion that houses a second electrical-circuit portion thereat, the first and second electrical-circuit portions, respectively, connected theretogether by way of a wired connector, said first hinge piece and said second hinge piece forming a passageway receiving the wired connector as it passes between the first housing and the second housing.

3. The hinge assembly of claim 2 wherein said first hinge piece is integrally-formed with the first body portion.

4. The hinge assembly of claim 2 wherein at least a portion of said second hinge piece is integrally-formed with the second body portion.

5. The hinge assembly of claim 2 wherein said second hinge piece further defines a second transversely-extending axis, rotation of a selected one of the first and second body portions further permitted about the second transversely-extending axis.

6. The hinge assembly of claim 2 wherein at least one of the first body portion and the second body portion comprises a force receiving surface for receiving a selected activation force, the selected actuation force for inducing the rotation of the at least the selected one of the first and second body portions in at least one of the first and second manners.

7. In a multi-part body formed of a first body portion and at least a second body portion, an improvement of a hinge assembly for hingedly connecting the first body portion together with the second body portion, said hinge assembly comprising:

a first hinge piece at least selectably affixed to the first body portion, said first hinge piece defining a first-transversely extending axis and defining a longitudinally-extending axis, said first hinge piece having a first annular hinge surface formed annularly about the longitudinally-extending axis;

a second hinge piece at least selectably affixed to the second body portion, said second hinge piece having a second annular hinge surface formed annularly about the longitudinally-extending axis and coaxially positioned with the first annular hinge surface of said first hinge piece; and a bearing for rotatably connecting said first hinge piece together with said second hinge piece, wherein the bearing comprises a ball bearing and wherein at least one of the first annular hinge surface and the second annular hinge surface further comprises a ball-bearing track for positioning of the ball bearing thereat;

wherein rotation of the first and second body portions with respect to each other is permitted about the longitudinally-extending axis in a first manner, and rotation of the first and second body portions with respect to each other is permitted about the first transversely-extending axis in a second manner.

8. The hinge assembly of claim 7 wherein the rotation selectably permitted of the first and second body portions about the longitudinally-extending axis comprises relative three hundred sixty degree rotation thereabout.

* * * * *